(12) United States Patent
Chong et al.

(10) Patent No.: US 7,664,210 B2
(45) Date of Patent: Feb. 16, 2010

(54) NON-COHERENT SYNCHRONOUS DIRECT-CONVERSION RECEIVING APPARATUS FOR COMPENSATING FREQUENCY OFFSET

(75) Inventors: Young-Jun Chong, Daejon (KR); Min-Soo Kang, Daejon (KR); Sung-Jin You, Daejon (KR); Tae-Jin Chung, Daejon (KR)

(73) Assignee: Electronics and Telecommunications Research Institute (KR)

( * ) Notice: Subject to any disclaimer, the term of this patent is extended or adjusted under 35 U.S.C. 154(b) by 575 days.

(21) Appl. No.: 11/521,739

(22) Filed: Sep. 15, 2006

(65) Prior Publication Data

US 2007/0127611 A1    Jun. 7, 2007

(30) Foreign Application Priority Data

Dec. 7, 2005    (KR) .................... 10-2005-0118964

(51) Int. Cl.
*H04L 27/06* (2006.01)
*H04L 27/00* (2006.01)
*H04B 1/26* (2006.01)
*H04B 1/18* (2006.01)

(52) U.S. Cl. .................. 375/344; 375/326; 455/324; 455/192.2

(58) Field of Classification Search .......... 375/316, 375/285, 346, 279–281, 283, 329, 326, 327, 375/229, 344, 330–332; 455/130, 173.1, 455/182.1, 182.3, 192.2, 192.3
See application file for complete search history.

(56) References Cited

U.S. PATENT DOCUMENTS 7,027,535 B1 *  4/2006  Aftelak ................ 375/344

7,421,040 B2 *  9/2008  Cowley ................ 375/316

(Continued)

FOREIGN PATENT DOCUMENTS

EP    1 289 163 A2    3/2003

(Continued)

OTHER PUBLICATIONS

A Study on the Effects of Frequency Error on the Mobile Performance in WCDMA System, Il-Kyoo Lee et al., Jun. 14, 2003, pp. 630-636.

(Continued)

*Primary Examiner*—Tesfaldet Bocure
(74) *Attorney, Agent, or Firm*—Blakely, Sokoloff, Taylor & Zafman

(57) ABSTRACT

A non-coherent synchronous direct-conversion receiving apparatus is provided. The apparatus includes a RF receiving unit, an I/Q ADC unit, and a digital signal processing unit for analyzing the digital signal received from the I/Q ADC unit to adjust a bandwidth of a variable receiving filtering unit according to the analyzing result, compensating a frequency offset to be correspondent with a symbol transmitting rate by extracting frequency offset information from the digital signal, compensating a frequency offset using the analyzing result, and applying a voltage corresponding to a sum of compensating values to the RF receiving unit. Therefore, the apparatus can compensate a frequency offset regardless of the magnitude of a frequency offset and performs a stable AFC operation through varying the bandwidth of a receiving filter by estimating the frequency offset with only data information, and adjusting a reference frequency twice through an interface signal.

4 Claims, 4 Drawing Sheets

U.S. PATENT DOCUMENTS

2006/0019624 A1 * 1/2006 Suominen ............... 455/200.1

FOREIGN PATENT DOCUMENTS

| KR | 1020010032165 A | 4/2001 |
| KR | 1020020067601 A | 8/2002 |
| KR | 1020030044446 A | 6/2003 |
| KR | 1020030092655 A | 12/2003 |
| KR | 1020060055225 A | 5/2006 |

OTHER PUBLICATIONS

A Frequency Offset Compensation Method for Ultra-Narrowband Digital Wireless Modems, Young-Jun Chong, 2004 IEEE, 5 pages.

* cited by examiner

NON-COHERENT SYNCHRONOUS DIRECT-CONVERSION RECEIVING APPARATUS FOR COMPENSATING FREQUENCY OFFSET

FIELD OF THE INVENTION

The present invention relates to a non-coherent synchronous direct-conversion receiving apparatus having a frequency offset compensating function; and, more particularly, to a non-coherent synchronous direct-conversion receiving apparatus having a frequency offset compensating function for accurately compensating a frequency offset by only using data information without reference frequency information. The non-coherent synchronous direct-conversion receiving apparatus can satisfy the frequency stability characteristics defined by the Association of Public Safety Communications Officials (APCO) Project 25 (P25) standard and minimize deterioration in receiver performance when a channel environment is changed by inter-symbol interference (ISI) and noise components.

DESCRIPTION OF RELATED ARTS

In the specification Phase I of the standard for the APCO P25 coherent Quadrate Phase Shift Keying (CQPSK) modulation scheme, a non-matching filter scheme that takes full charge of pulse shaping is used in a transmitting side to enable single receiver to receive both of a compatible 4-level frequency modulation (C4FM) signal, for example, in a 12.5 kHz channel bandwidth, and a CQPSK signal, for example, in a 6.25 kHz channel bandwidth.

However, the non-matching filter scheme degrades the system performance significantly compared to a typical $\pi/4$ differential quadrature phase shift keying (DQPSK) modulation scheme in which a transmitting filter and a receiving filter use the same matching scheme.

In this CQPSK modulation scheme employing the non-matching filter, a frequency response characteristic has a large effect on the bit error rate (BER) performance of the system. Accordingly, the CQPSK modulation scheme using the non-matching filter necessarily requires the channel bandwidth of a receiving filter to be optimized in order to prevent the system performance from being degraded by the channel environment changing factors such as ISI, noise components, and frequency offsets.

Also, the CQPSK modulation scheme using the non-matching filter must have a capability to compensate a frequency offset by estimating the frequency offset only using data information because the CQPSK modulation scheme has an ultra narrow bandwidth characteristic such as 6.25 kHz bandwidth and uses a non-coherent synchronous scheme that does not provide reference frequency information such as a pilot signal.

A frequency offset component is mainly generated by the frequency stability characteristic of a voltage controlled temperature compensated crystal oscillator (VCTCXO) used as a reference clock generator in a terminal and the Doppler frequency according to the moving speed of a terminal. Since this frequency offset component turns the constellation of in-phase (I) and quadrature-phase (Q) signals in a digital modulation scheme, it makes it difficult to accurately demodulate a transmitting signal and causes the deterioration in BER performance of a system.

In the case of an ultra narrow bandwidth in which the bandwidth of a modulation signal is narrow, the rate of occurring frequency offsets has a relatively large effect on the shifting of signal spectrum. Therefore, very little frequency offset may degrade the system performance seriously. In order to prevent the deterioration of the system performance due to the frequency offset, an accurate automatic frequency offset compensation (AFC) scheme is required. When the AFC is implemented, the initial estimating value of the frequency offset must be less than 12.5% of a symbol transmitting rate. It is because that the system BER may abruptly increase when a phase difference between symbols during one symbol period of a transmitting signal is over $+\pi/4$ That is, the system BER may abruptly increase when a frequency offset value is more than 12.5% of a symbol transmitting rate due to the phase different characteristics of the CQPSK modulation scheme where phase difference in one symbol period are $+3\pi/4$, $+\pi/4$, $-/4$, $-3\pi/4$.

If the bandwidth of a receiving filter is smaller than a signal bandwidth in an ideal environment with no frequency offset, inter-symbol interference (ISI) may occur because a part of signal components may be lost, and the system BER performance may be deteriorated significantly. Although the bandwidth of the receiving filter is sufficient, the ISI may occur due to amplitude and phase distortion.

On the other hand, if the bandwidth of the receiving filter increases, the ISI occurrence probability decreases, whereas a noise power increases. This may further deteriorate the BER performance. Accordingly, in designing of a receiving filter, it is necessary to reduce the bandwidth of a receiving filter and to maximize system performance within the range that the ISI does not affect the system performance.

However, if the channel bandwidth of a receiving filter is fixed in a real channel environment with a frequency offset, a receiving noise power value changes according to the amount of a frequency offset and it causes the receiver performance to be degraded. Therefore, the channel bandwidth of a receiving filter should be optimized according to the frequency offset so as to sustain the receiving performance of a receiver.

To summarize, in the digital modulation scheme, a frequency offset component deteriorates the receiving BER performance because it turns the constellation of I/Q signals and makes it difficult to demodulate signals accurately.

Also, in the case of an ultra-narrow bandwidth in which the bandwidth of a modulation signal is narrow, the occurrence rate of frequency offsets has a relatively large effect on the shifting of a signal spectrum to cause the deterioration in system performance even when a frequency offset occurs slightly. Therefore, to minimize such an effect, AFC technique is used to compensate the frequency offset.

If the channel bandwidth of a receiving filter is fixed in such a real channel environment with a frequency offset, a receiving noise power value changes according to the amount of a frequency offset to cause the receiving performance to be further degraded.

FIG. 1 shows a non-coherent synchronous direct-conversion receiving apparatus in accordance with the related art.

As shown in FIG. 1, the conventional non-coherent synchronous direct-conversion receiving apparatus estimates a frequency offset by only using data information without reference frequency information to compensate a frequency offset digitally. Therefore, it is advantageous in that it has a simple configuration since an interface signal with a radio frequency (RF) module is not required for controlling the VCTCXO.

However, in the conventional non-coherent synchronous direct-conversion receiving apparatus, I/Q low-pass filters 102 and 103 in a RF receiving module 100, and a receiving filter 111 in a digital signal processing (DSP) module 110 are designed to satisfy the adjacent channel suppression characteristic while having a fixed frequency characteristic. Therefore, plenty of signal information is lost or noise components increase by the filters due to the frequency offset of the RF receiving module 100 and the signal received before the AFC begins to operate. Accordingly, it has a problem that the significant deterioration in receiving performance occurs according to the amount of the frequency offset even though the AFC operation is performed. Moreover, if the frequency offset is great, the receiver function itself becomes malfunctioned because the AFC operation becomes abnormal.

SUMMARY OF THE INVENTION

It is, therefore, an object of the present invention to provide a non-coherent synchronous direct-conversion receiving apparatus for compensating a frequency offset regardless of the magnitude of a frequency offset and performing a stable AFC operation through varying the bandwidth of a receiving filter by estimating the frequency offset digitally with only data information not reference frequency information, and adjusting a reference frequency twice through an interface signal with a RF module by calculating the frequency offset.

In accordance with an aspect of the present invention, there is provided a non-coherent synchronous direct-conversion receiving apparatus including: a RF receiving unit for performing a filtering operation and a low-noise amplifying operation on a signal received through an antenna, demodulating the amplified signal to a baseband I/O signals according to a reference clock in a direct-conversion scheme, and performing a low-pass filtering operation on the demodulated signal; an I/Q analog-to-digital converting unit for converting the I/Q signals received from the RF receiving unit to a digital signal; and a digital signal processing unit for analyzing the digital signal received from the I/Q analog-to-digital converting unit to adjust a bandwidth of a variable receiving filtering unit according to the analyzing result, compensating a frequency offset to be correspondent with a symbol transmitting rate by extracting frequency offset information from the digital signal, compensating a frequency offset by using the analyzing result, and applying a voltage corresponding to a sum of compensating values to the RF receiving unit, so as to compensate the frequency offset.

BRIEF DESCRIPTION OF THE DRAWINGS

The above and other objects and features of the present invention will become better understood with regard to the following description of the preferred embodiments given in conjunction with the accompanying drawings, in which.

DETAILED DESCRIPTION OF THE INVENTION

Hereinafter, a non-coherent synchronous direct-conversion receiving apparatus having a function for automatically compensating a frequency offset in accordance with a preferred embodiment of the present invention will be described in more detail with reference to the accompanying drawings.

Figure 1:
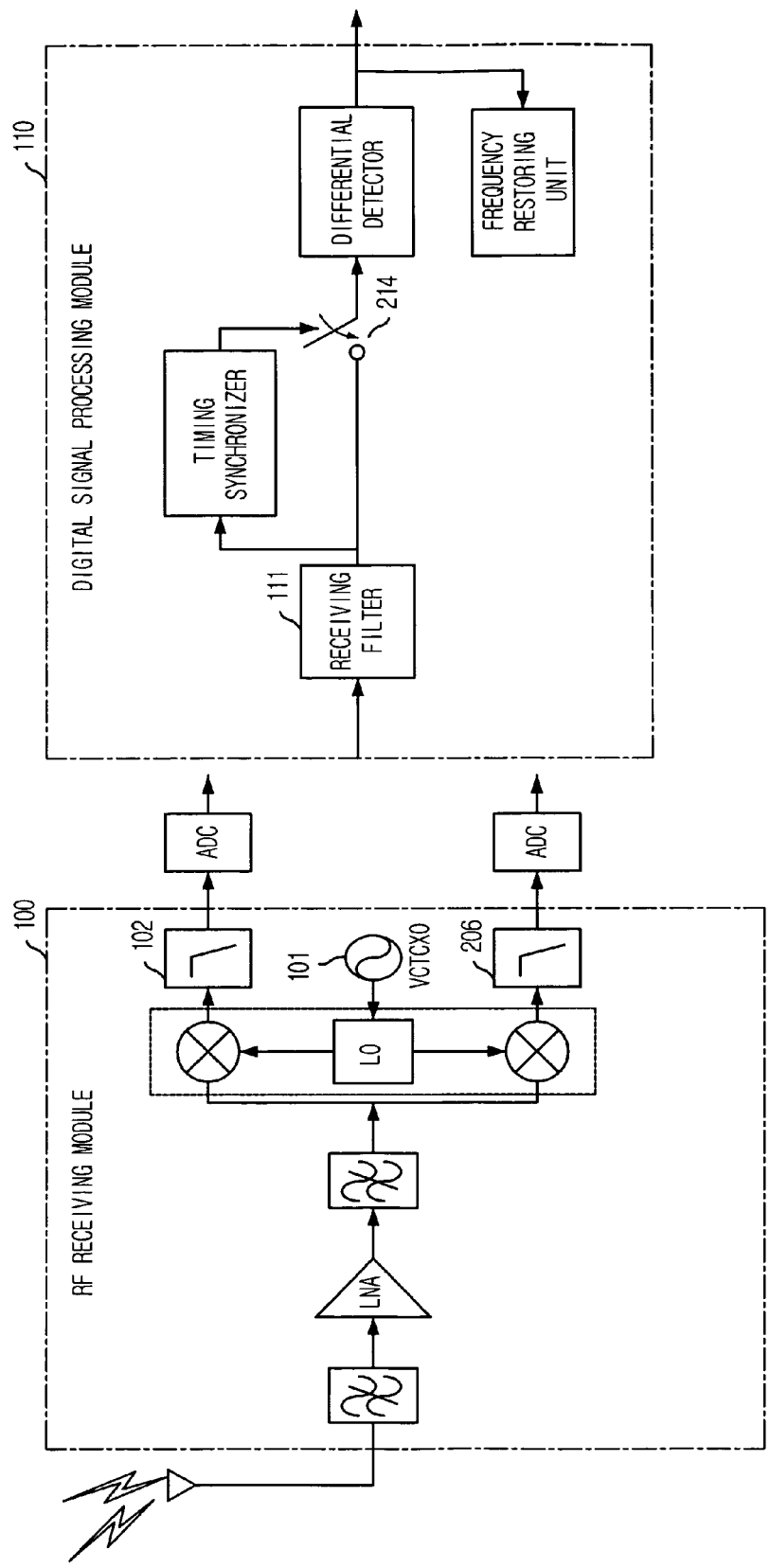
FIG. 1 is a block diagram illustrating a non-coherent synchronous direct-conversion receiving apparatus according to a related art.
Figure 2:
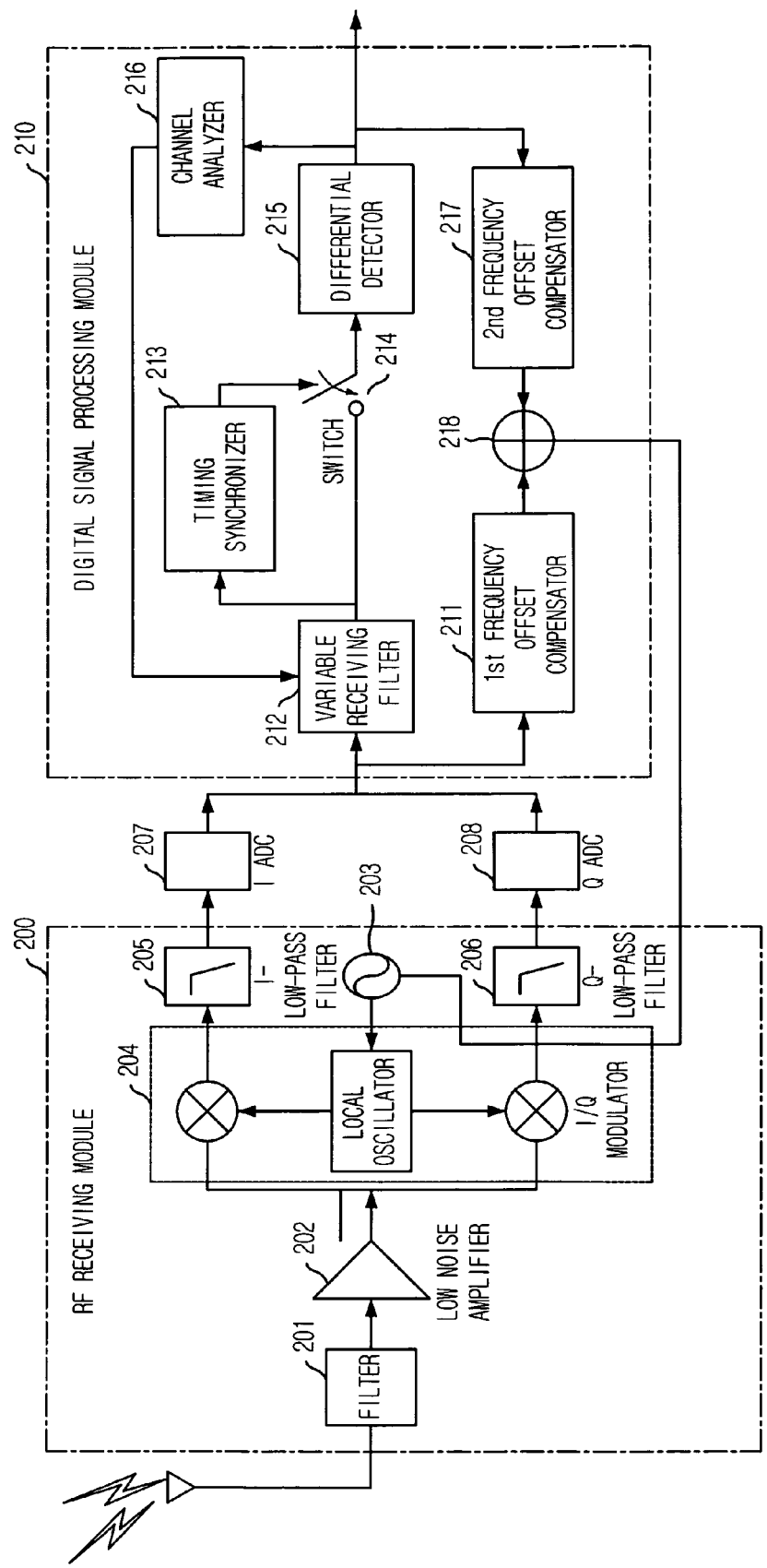
FIG. 2 is a block diagram illustrating a non-coherent synchronous direct-conversion receiving apparatus in accordance with an embodiment of the present invention.

FIG. 2 is a block diagram illustrating a non-coherent synchronous direct-conversion receiving apparatus in accordance with an embodiment of the present invention.

As shown in FIG. 2, the non-coherent synchronous direct-conversion receiving apparatus according to the present embodiment includes a RF receiving module 200, I/Q analog-to-digital converters (ADCs) 207 and 208, and a digital signal processing module 210.

The RF receiving module 200 performs a filtering operation and a low-noise amplifying operation on a signal received through an antenna, demodulates the amplified signal to baseband I/Q signals according to a reference clock in a direct-conversion scheme, and performs a low-pass filtering on the demodulated signal.

The I/Q ADCs 207 and 208 convert the I/Q signals received from the RF receiving module 200 to a digital signal.

The digital signal processing module 210 analyzes the digital signal received from the I/Q ADCs 207 and 208 to adjust the bandwidth of a variable receiving filter 212 according to the analyzing result, compensates a frequency offset to be correspondent with a symbol transmitting rate by extracting frequency offset information from the digital signal, compensates a frequency offset to be within $\pm\pi/4$ using the analyzing result, and applies the voltage corresponding to the sum of compensating values to a reference clock generator 203 of the RF receiving module 200, so as to automatically compensate the frequency offset.

Herein, the RF receiving module 200 includes a filter 201 for filtering the signal received through the antenna; a low-noise amplifier (LNA) 202 for performing the low-noise amplifying operation on the signal filtered by the filter 201; the reference clock generator 203 such as voltage controlled temperature compensated crystal oscillator VCTCXO for generating the reference clock in response to control of the digital signal processing module 210; an I/Q demodulator 204 for demodulating the signal amplified by the LNA 202 to the baseband I/Q signals in the direct conversion scheme; and I/O low-pass filters 205 and 206 for performing the low-pass filtering operation on the baseband I/Q signals demodulated by the I/Q demodulator 204.

The digital signal processing module 210 includes the first frequency offset compensator 211 for compensating the frequency offset to be correspondent with the symbol transmitting rate by extracting the frequency offset information from the digital signal (symbol data) received from the I/Q ADCs 207 and 208; the variable receiving filter 212 for filtering the digital signal received from the I/Q ADCs 207 and 208; a timing synchronizer 213 for synchronizing the timing of the signal filtered by the variable receiving filter 212; a switch 214 for delivering the signal synchronized by the timing synchronizer 213; a differential detector 215 for detecting the frequency offset component of the synchronized signal received from the switch 214 by converting the frequency offset component to a phase error component; a channel analyzer 216 for analyzing current channel condition and adjusting the bandwidth of the variable receiving filter 212 according to the detecting result of the differential detector 215; the second frequency offset compensator 217 for compensating the frequency offset to be within ±π/4 by using the detecting result of the differential detector 215; and an adder 218 for adding the compensating values in the first and second frequency offset compensators 211 and 217 and applying the corresponding voltage to the sum of the compensating values to the reference clock generator 203.

Herein, the first frequency offset compensator 211 compensates the frequency offset up to twice maximum symbol transmitting rate, and it operates when the frame synchronizing signal of an initial terminal signal is not detected.

The differential detector 215 converts the frequency offset component of the synchronized signal delivered through the switch 214 to the phase error component.

Figure 3:
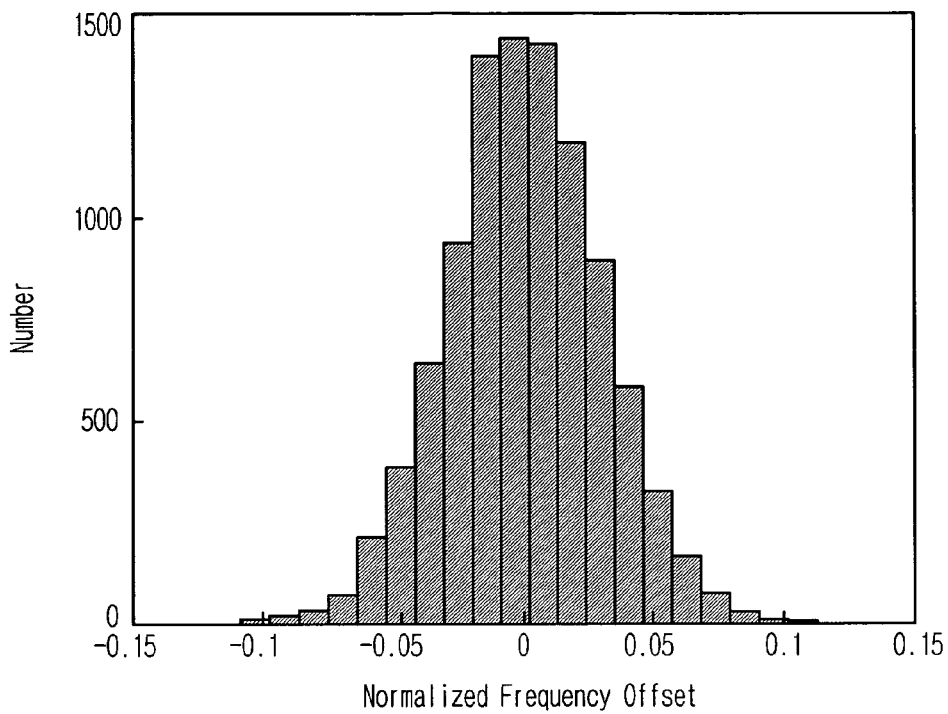
FIG. 3 is a graph showing the estimating offsets of the first frequency offset compensator in accordance with the present invention.

The first frequency offset compensator 211 extracts L phase differences between input data and delayed data and estimates the frequency offset information through the average of the L phase differences. The estimated frequency offsets are shown in FIG. 3.

Unlike the first frequency offset compensator 211 that accumulates and uses the L phase differences, the second frequency offset compensator 217 extracts phase information from each data after the differential detecting operation, and immediately uses the phase information in a phase offset compensation operation. Then, the second frequency offset compensator 217 accumulates only offset information and uses it in the phase offset compensation of the next data. At this time, since the second frequency offset compensator 217 cannot compensate the frequency offset more than ⅛ of the symbol frequency, the first frequency offset compensator 211 should send the signal which has the frequency offset less than at least ⅛ of the symbol frequency to the second frequency offset compensator 217.

The first frequency offset compensator 211 estimates the frequency offset by using following Eq. 1.

$$\hat{v}T = \frac{2}{\pi} \arg\left\{\sum_{k=0}^{4L_0-1} x(kT/4)x^*[(k-1)T/4]\right\}$$ Eq. 1

Herein, $\hat{v}$ denotes the frequency offset to be estimated, T denotes a symbol period, x denotes an input signal oversampled four times the symbol period, and $L_0$ denotes the number of symbols used to estimate the frequency offset.

FIG. 3 is a graph showing the offset estimation of the first frequency offset compensator in accordance with the present invention.

As shown in FIG. 3, the graph shows the analyzing result by performing computer simulation on the histogram of normalized frequency offsets, and shows the probability that the estimating frequency offset after the first frequency offset compensation is more than ⅛ (π/4) of the symbol frequency is very small. Therefore, it can be seen that this embodiment can be employed to a real APCO P25 terminal unit.

Hereinafter, the channel analyzer 216 will be described in detail.

The channel analyzer 216 determines current channel condition by obtaining the average value of frame synchronizing signal errors. In other words, if the average value of the frame synchronizing signal errors is large, it means that the channel condition is not good so that a relatively narrow band filter is required. In contrast, if the average value of the frame synchronizing signal errors is small, it means that the channel condition is good so that a relatively wide band filter is required.

When a signal is input, the channel analyzer 216 determines whether the signal is identical to the predetermined synchronizing signal or not through the frame synchronizing signal comparator. At this time, the determination is made by the predetermined threshold value. If the number of errors by the comparison between the input signal and the predetermined synchronizing signal is over the threshold value, it is determined that the signal is not a synchronizing signal. If the number of errors is less than the threshold value, the signal is determined as a synchronizing signal. When the signal is determined as the synchronizing signal, the current channel condition is determined by obtaining the average of the number of errors. If the average reaches the threshold value, the current channel condition is determined to be bad, and the filter coefficient having the wider bandwidth than the signal bandwidth is selected. If the number of errors is zero, the current channel condition is determined to be good, and the filter coefficient having the narrower bandwidth than the signal bandwidth is selected.

Figure 4:
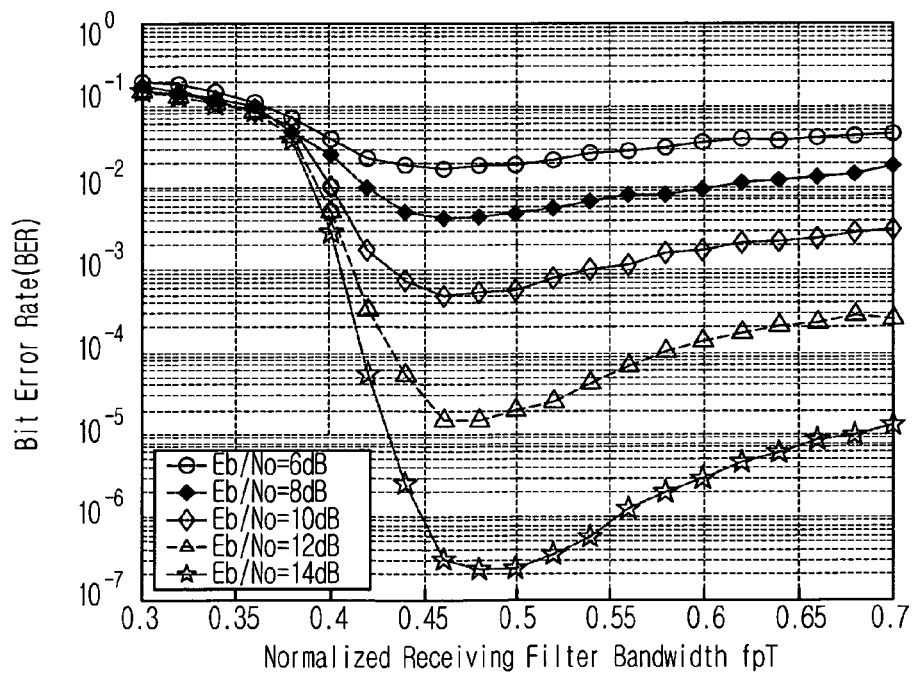
FIG. 4 is a graph showing how the variation of the filter bandwidth affects BER performance in accordance with the present invention.

FIG. 4 is a graph showing how the variation of the filter bandwidth affects BER performance in accordance with the present invention.

Figure 5:
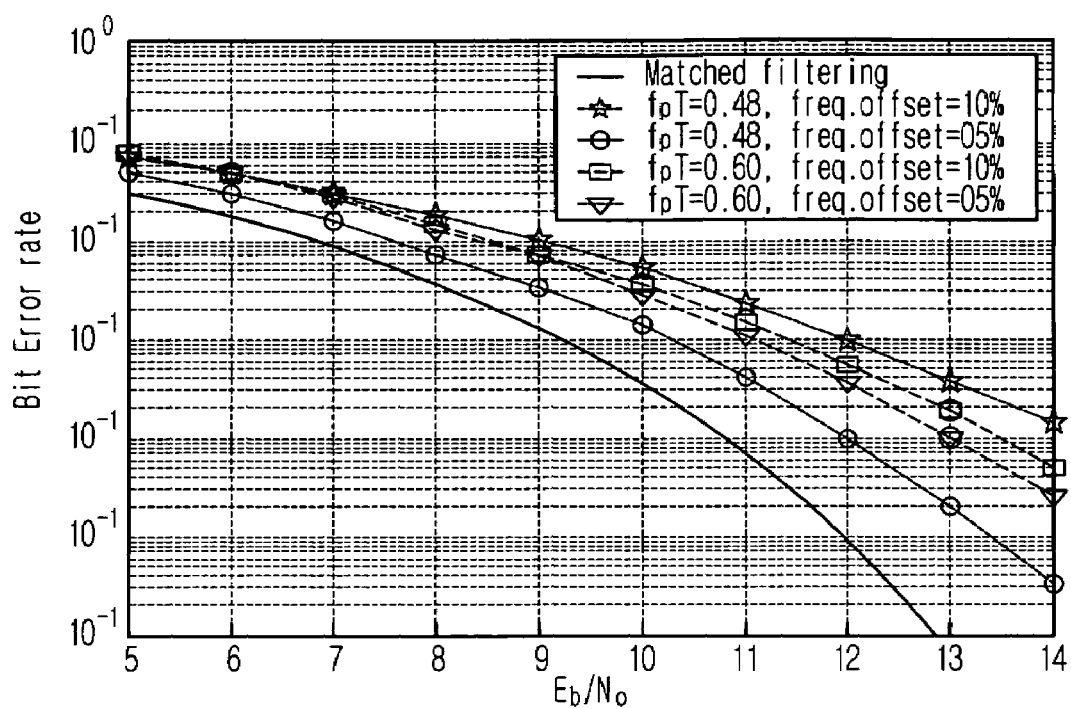
FIG. 5 is a graph showing how the frequency offset affects the bandwidth of a receiving filter in accordance with the present invention.

FIG. 5 is a graph showing how the frequency offset affects the bandwidth of a receiving filter in accordance with the present invention.

As shown in FIG. 5, if the frequency offset exists, it requires that the bandwidth of the receiving filter is wider than the optimized bandwidth, $f_pT=0.6$.

In the embodiment of the present invention, the average of the phase differences between the input signals and the delayed signals becomes zero if the frequency offset does not exist in data inputted to the first frequency offset compensator 211. On the contrary, if the frequency offset exists in the input data, the average of the phase differences varies, wherein the average is the amount of the frequency offset.

The present invention satisfies the frequency stability characteristics, <2.5 ppm, and receiving sensitivity defined in the digital ultra narrow bandwidth terminal specification by adjusting the bandwidth of the receiving filter through the frequency offset compensation and channel analysis.

As described above, the non-coherent synchronous direct-conversion receiving apparatus according to the present invention can compensate a frequency offset regardless of the magnitude of a frequency offset and performing a stable AFC operation through varying the bandwidth of a receiving filter by estimating the frequency offset digitally with only data information not reference frequency information, and adjusting a reference frequency twice through an interface signal with a RF module by calculating the frequency offset.

The present application contains subject matter related to Korean patent application No. 2005-0118964, filed with the Korean Intellectual Property Office on Dec. 7, 2005, the entire contents of which is incorporated herein by reference.

While the present invention has been described with respect to certain preferred embodiments, it will be apparent to those skilled in the art that various changes and modifications may be made without departing from the spirits and scope of the invention as defined in the following claims.

What is claimed is:

1. A non-coherent synchronous direct-conversion receiving apparatus comprising:
   an RF receiving means for performing a filtering operation and a low-noise amplifying operation on a signal received through an antenna, demodulating the amplified signal to a baseband I/Q signals according to a reference clock in a direct-conversion scheme, and performing a low-pass filtering operation on the demodulated signal;

an I/Q analog-to-digital converting means for converting the I/Q signals received from the RF receiving means to a digital signal; and a digital signal processing means for analyzing the digital signal received from the I/O analog-to-digital converting means to adjust a bandwidth of a variable receiving filtering unit according to the analyzing result, compensating a frequency offset to be correspondent with a symbol transmitting rate by extracting frequency offset information from the digital signal, compensating a frequency offset by using the analyzing result, and applying a voltage corresponding to a sum of compensating values to the RF receiving means, so as to compensate the frequency offset.

2. The apparatus as recited in claim 1, wherein the RF receiving means includes:
   a filtering unit for filtering the signal received through the antenna;
   a low-noise amplifying unit for performing the low-noise amplifying operation on the signal filtered by the filtering unit;
   a reference clock generating unit for generating the reference clock in response to control of the digital signal processing means;
   an I/Q demodulating unit for demodulating the signal amplified by the low-noise amplifying unit to the baseband I/O signals according to the reference clock generated by the reference clock generating unit in the direct-conversion scheme; and
   an I/Q filtering unit for performing the low-pass filtering operation on the baseband I/Q signals demodulated by the I/Q demodulating unit.

3. The apparatus as recited in claim 2, wherein the digital signal processing means includes:
   a first frequency offset compensating unit for compensating the frequency offset according to the symbol transmitting rate by extracting the frequency offset information from the digital signal received from the I/O analog-to-digital converting means;
   the variable receiving filtering unit for filtering the digital signal received from the I/Q analog-to-digital converting means;
   a timing synchronizing unit for synchronizing a timing of the signal filtered by the variable receiving filtering unit;
   a switching unit for delivering the signal synchronized by the timing synchronizing unit;
   a differential detecting unit for detecting a frequency offset component of the synchronized signal received from the switching unit by converting the frequency offset component to a phase error component;
   a channel analyzing unit for analyzing current channel condition and adjusting the bandwidth of the variable receiving filtering unit according to the detecting result of the differential detecting unit;
   a second frequency offset compensating unit for compensating the frequency offset by using the detecting result of the differential detecting unit; and
   an adding unit for adding the compensating values in the first and second frequency offset compensating units, and applying the voltage corresponding to the sum of the compensating values to the reference clock generating unit.

4. The apparatus as recited in claim 3, wherein the second frequency offset compensating unit compensates the frequency offset to be within $\pm\pi/4$ by using the detecting result of the differential detecting unit.

* * * * *